United States Patent [19]

Waterman

[11] Patent Number: 4,841,787
[45] Date of Patent: Jun. 27, 1989

[54] RETRACTOR TOOL

[75] Inventor: David K. Waterman, Chino, Calif.

[73] Assignee: Rohrback Cosasco Systems, Inc., Santa Fe Springs, Calif.

[21] Appl. No.: 262,174

[22] Filed: Oct. 18, 1988

Related U.S. Application Data

[63] Continuation of Ser. No. 118,580, Nov. 6, 1987, abandoned.

[51] Int. Cl.⁴ .............................................. G01F 15/18
[52] U.S. Cl. ................................................... 73/866.5
[58] Field of Search ................. 73/866.5, 86; 204/225, 204/286, 297 R; 324/447; 374/208, 209, 148

[56] References Cited

U.S. PATENT DOCUMENTS

| | | | |
|---|---|---|---|
| 2,780,094 | 2/1957 | Fink | 73/53 |
| 3,025,464 | 3/1962 | Bond | 324/61 R |
| 3,174,332 | 3/1965 | Echtler et al. | 73/86 |
| 3,246,521 | 4/1966 | Humphrey | 374/148 |
| 3,627,493 | 12/1971 | Manley | 73/86 |
| 3,679,490 | 7/1972 | Finkbiner | 136/221 |
| 4,177,676 | 12/1979 | Welker | 73/198 |
| 4,327,586 | 5/1982 | Goddard | 73/866.5 |
| 4,387,592 | 6/1983 | Welker | 73/198 |
| 4,537,071 | 8/1985 | Waterman | 73/866.5 |
| 4,631,961 | 12/1986 | Yohe et al. | 73/866.5 |
| 4,631,967 | 12/1986 | Welker | 73/861.25 |
| 4,633,713 | 1/1987 | Mesnard et al. | 73/866.5 |

Primary Examiner—Stewart J. Levy
Assistant Examiner—Robert R. Raevis
Attorney, Agent, or Firm—Edgar A. Zarins; Malcolm L. Sutherland; Leon E. Redman

[57] ABSTRACT

A retractor tool adapted to insert and retrieve sensing, measuring or control devices in high pressure containers, such as a pipeline, through an access valve and stuffing box without interrupting the fluid flow within the vessel or relieving the pressure. The tool is connected to the stuffing box by a clamshell clamp which utilizes the threaded rod of the apparatus at its hinge axis. The measuring device is inserted or retracted by the operation of a thrust coupling on the retractor threaded rod. Translational movement is imparted to the thrust coupling by means of a handle nut. The retractor tool can be attached to both hex stuffing boxes and cylindrical stuffing boxes.

21 Claims, 2 Drawing Sheets

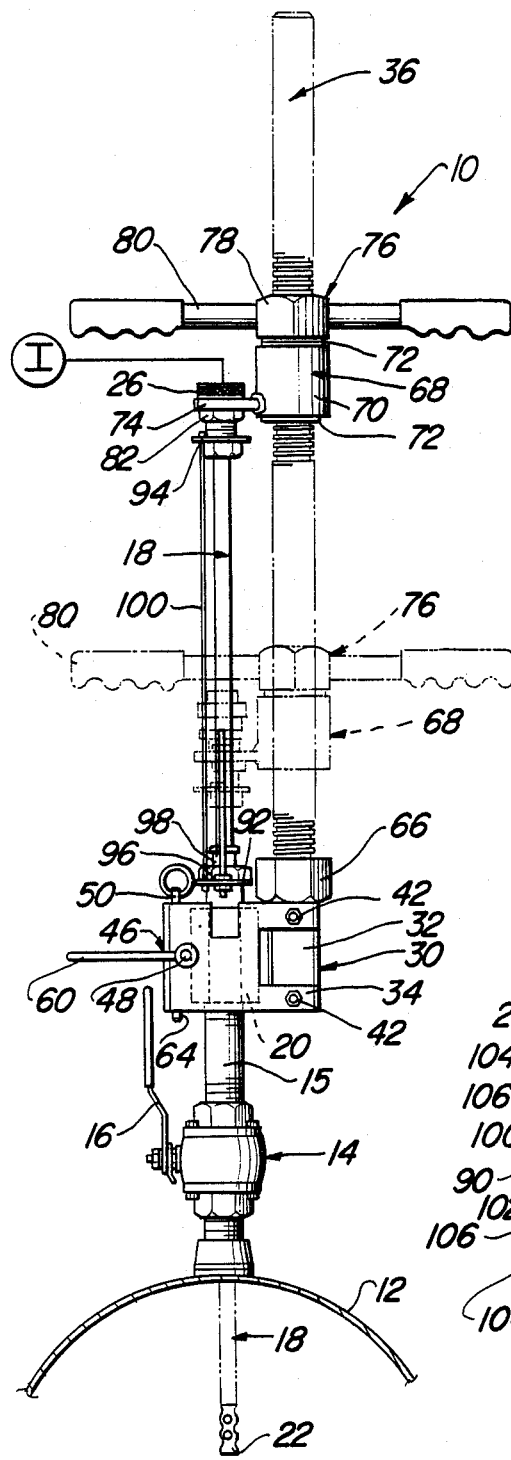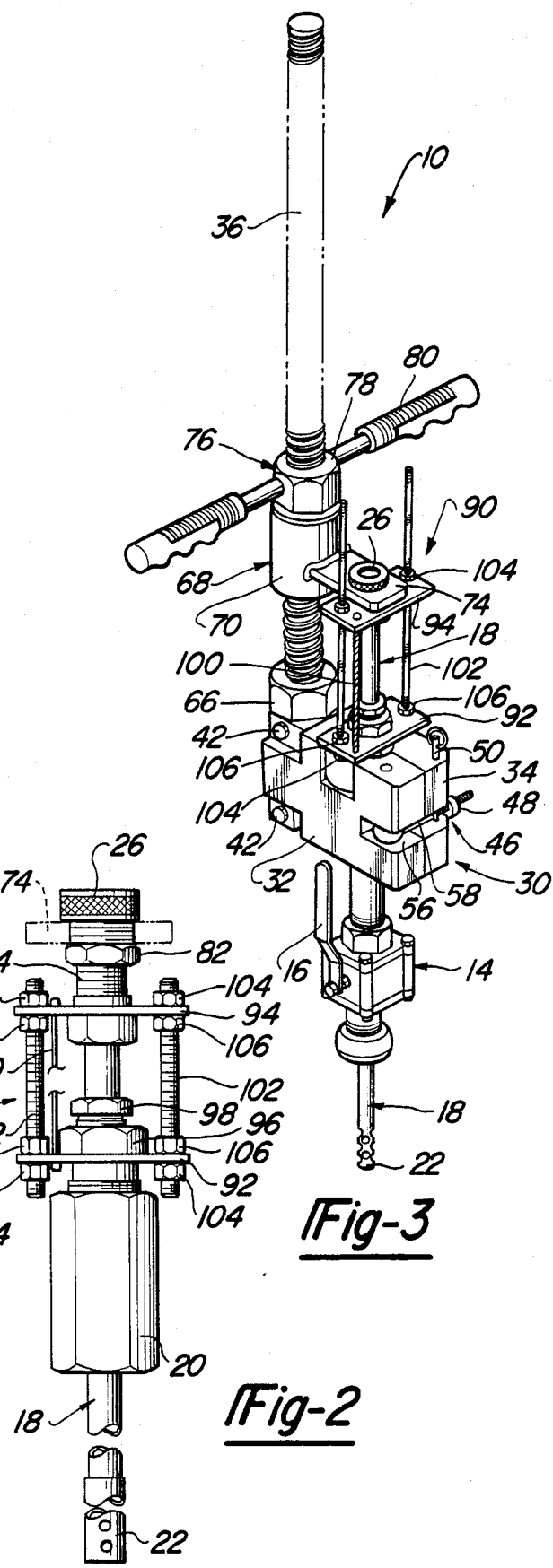

RETRACTOR TOOL

This is a continuation of co-pending application Ser. No. 118,580 filed on Nov. 6, 1987, and now abandoned.

BACKGROUND OF THE INVENTION

I. Field of the Invention

This invention relates to a tool for inserting and retrieving a measuring device within a high pressure pipeline and, in particular, to a simple apparatus adapted to quickly attach to on the stuffing box associated with an access valve of a high pressure pipeline in order to control the insertion and retrieval of a measuring device.

II. Description of the Prior Art

Various devices have been developed in order to test the fluid flow in high pressure pipelines. Generally, these tools utilize an access or gate valve built into the side wall of the pipeline. Because the fluid is pumped through the pipeline at high pressure, it is not only necessary that the probing tool prevent loss of pressure but also that it is sufficiently secured to prevent blowouts. Many insertion devices are secured to the access valve by mating flanges connected by a plurality of bolts. Alternate securing assemblies include mating threaded engagement although such constructions are normally not utilized in extreme pressure vessels. However, either of these mounting methods can be cumbersome requiring extensive tooling and assembly.

The mechanics for inserting the measuring probe through the access valve also widely vary. The most common, although the most complex, utilize hydraulic fluid pressure to manipulate a piston connected to the probe head. The piston and cylinder are normally positioned at the top of the tool thereby adding to the height of the tool requiring increased clearance. In addition, the support frame associated with the hydraulic assembly increases the weight of the tool thereby reducing its manipulability. Furthermore, the hydraulic assembly is subject to breakdown and fluid loss which can increase the chances of pressure loss or blowout.

Alternate insertion mechanisms include threaded stem and nut constructions which allow insertion or retraction by manipulation of a handwheel or a separate hand tool. Generally such devices comprise a probe head secured to the end of the threaded rod which is raised or lowered as the rod is rotated. As with the hydraulic assembly, clearance is needed above the tool for retraction of the threaded rod and probe.

Still other retraction tools utilize a gear box to manipulate the probe head into and out of the pressure pipeline. Because of the strength and securement necessary to prevent blowout and pressure loss, these gear assemblies can be large and heavy thereby adding to the overall weight of the tool.

SUMMARY OF THE PRESENT INVENTION

The present invention overcomes the disadvantages of the prior known retractor tools by providing a portable and easily maneuverable tool which can be readily clamped to either a hex or cylindrical stuffing box of a high pressure pipeline.

The retractor tool of the present invention is designed to insert and retract sensing, measuring or control devices in high pressure pipelines through an access valve and stuffing box without interrupting fluid flow or relieving the pressure within the pressurized vessel. The tool is connected to the stuffing box utilizing a clam shell clamp. The stuffing box is positionally captured by the clamp thereby allowing the tool to be orientated as desired. A lever nut secures the clamp around the stuffing box and an auxiliary pin is provided to prevent the clamp from opening inadvertently. The hinge of the clamp is connected to a threaded rod which acts as the hinge axis for the clamp. A thrust coupling mounted to the threaded rod manipulates the probe into and out of the pipeline through the access valve. Translational movement is imparted to the thrust coupling by means of a handle nut. As the handle nut is rotated downwardly, the thrust coupling moves the probe into the pipeline.

The retractor tool of the present invention provides reduced weight, length and complexity by eliminating a gear box and a supportive frame. Side loads on the probe are minimized by a pair of flanged bushings in the thrust coupling which ensures linear movement of the coupling without the need for a guide frame or track. Furthermore, as a result of the configuration of the clam shell clamp, the tool is easily installed and secured to either hex or cylindrical stuffing boxes. Finally, because the thrust coupling is detachably secured to the probing device, different measuring and sensing devices can be utilized in conjunction with the present invention.

Other objects, features and advantages of the present invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawings in which like reference characters refer to like parts throughout the views and in which:

FIG. 1 is a side plan view of the retractor tool embodying the present invention mounted to a stuffing box and access valve assembly of a pressurized fluid vessel;

FIG. 2 is a partial enlarged perspective of the auxiliary clamp assembly used in conjunction with the present invention;

FIG. 3 is an elevated perspective of the retractor tool embodying the present invention.

DETAILED DESCRIPTION OF A PREFERRED EMBODIMENT OF THE PRESENT INVENTION

Figure 4:
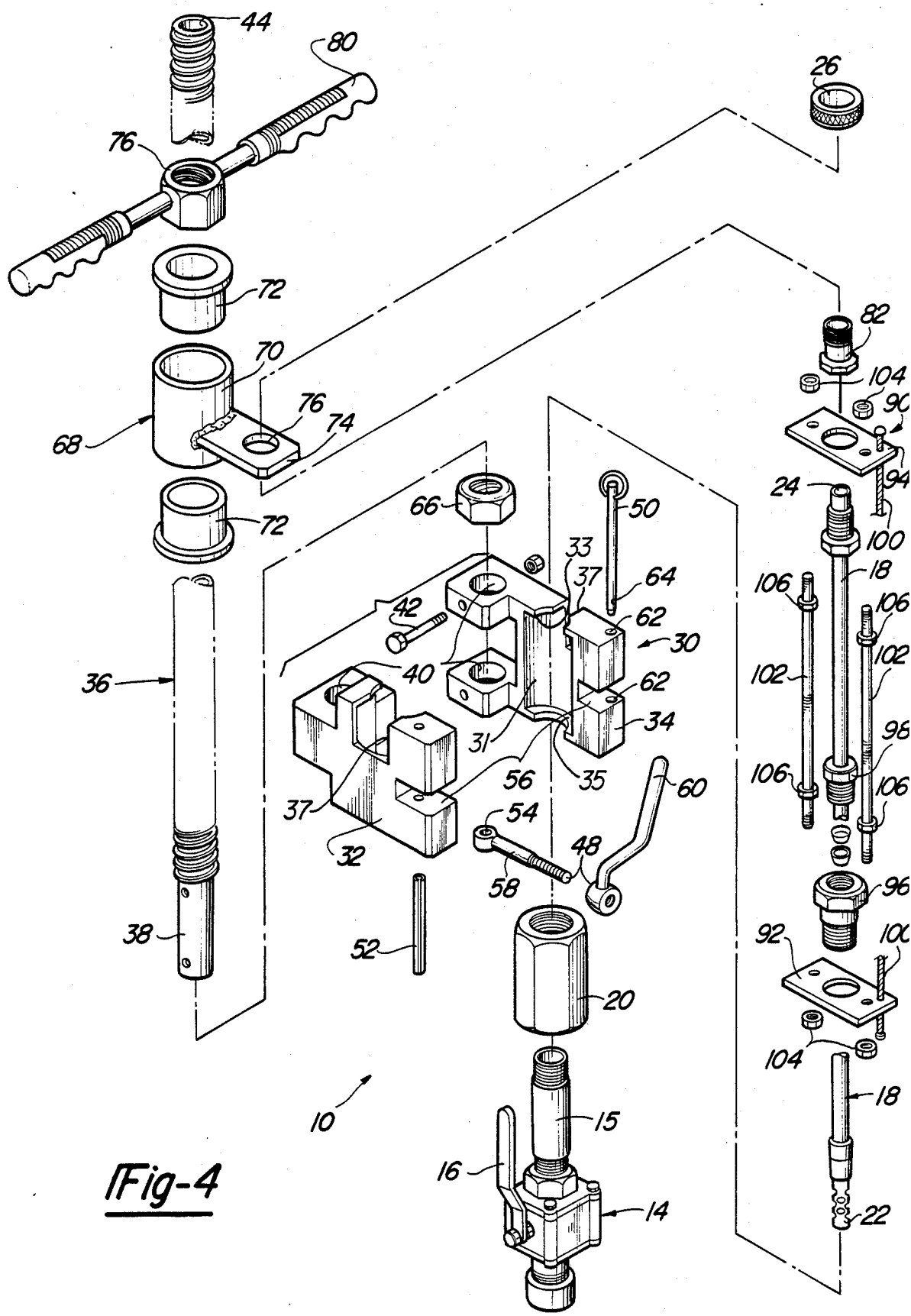
FIG. 4 is an exploded view of the retractor tool of the present invention.

Referring first to FIG. 1 of the drawing, there is shown the retractor tool 10 embodying the present invention mounted to a pressurized fluid vessel such as a fluid pipeline 12. Preferably, the pipeline 12 is provided with an access valve 14 which can be selectively opened to permit access to the interior of the pipeline 12. The valve 14 is provided with an operating member 16 to selectively close the valve 14 when access is not required and therefore prevent fluid leakage as a result of the high pressure interior environment of the pipeline 12. The access valve 14 also allows insertion and retraction of a sensing probe 18 into and from the interior of the pipeline 12 in order to selectively measure or control the fluid properties within the high pressure vessel 12. To facilitate insertion and prevent leakage past the probe 18 when the access valve 14 is open, a gland body or stuffing box 20 is normally mounted to the access valve 14. The probe 18 travels through the stuffing box 20 during retraction and insertion as will be subsequently described.

Referring now to FIGS. 1 through 3, the probe 18 has an elongated construction with an end shield 22 to protect the lower end of the probe as it is inserted into the high pressure environment. The probe 18 may include a plurality of leads traveling therethrough in order to measure any number of conditions within the pipeline 12 including flow rate, temperature, corrosion, etc. The leads terminate at the upper end of the probe 18 to form a female receptacle or plug 24. The upper end 24 of the probe 18 is shown in the drawings protected by a cap 26 in order to prevent damage to the leads therein. However, in operation, the probe may be connected to monitoring instruments I which provide an accurate readout of conditions within the pipeline 12. The retractor tool 10 of the present invention is utilized to lower and raise the probe 18 into and from the pipeline 12 without a loss of pressure therein and while maintaining blowout prevention under the high pressure conditions.

The retractor tool 10, as shown best in FIGS. 1, 3 and 4, is clampingly mounted to the gland body or stuffing box 20 of the access valve assembly 14. A clamshell clamp assembly 30 is provided at the lower end of the tool 10 for securely attaching the tool 10 to the access valve assembly. The clamp assembly 30 is adapted to engage either a hex stuffing box 20 as shown in the drawing or, in the alternative, a cylindrical stuffing box where exotic alloys are required and hex stock is unavailable. The clamp assembly 30 comprises a pair of clamp halves 32 and 34 which are pivotally joined so as to facilitate engagement with the stuffing box 20. The clamp halves 32 and 34 cooperate to form a cylindrical interior chamber 31 adapted to receive the stuffing box 20. The chamber 31 includes upper shoulders 33 and lower shoulders 35 to prevent movement of the clamp assembly 30 relative to the stuffing box 20. Moreover, the clamp halves 32 and 34 include removed portions 37 such that the clamp 30 can be attached to the probe 18 without interfering with the auxiliary clamp assembly normally associated with the probe 18 as will be described in greater detail hereinafter. An elongated threaded rod 36 forms the hinge axis 38 of the clamp assembly 30 about which the clamp halves 32 and 34 pivot. The lower end of the threaded rod 36 extends through axially aligned throughbores 40 formed in both clamp halves and is secured to clamp half 34 by bolts 42. In a preferred embodiment of the present invention, the threaded rod 36 is hollow having an axial bore 44 extending therethrough to reduce the weight of the retractor tool 10. The length of the threaded rod 36 can be varied according to the length of the probe 18 as will be readily apparent.

To secure the tool 10 to the stuffing box 20 such that the extreme pressure within the pipeline 12 does not blowout the probe 18 and to minimize any undesirable side load on the probe 18 during insertion or retraction, the clamp assembly 30 includes locking means 46 to lockingly secure the clamp halves 32 and 34 together about the stuffing box 20. The locking means 46 consists of a lever nut 48 pivotally secured to a first clamp half 32 and an auxiliary release pin 50 extending through a second clamp half 34. The lever nut 48 is attached to the clamp half 32 by a pivot rod 52 which extends longitudinally through the clamp half 32 and the eyelet 54 of the lever nut 48 such that the lever nut 48 can pivot through the slots 56. Preferably, the lever nut 48 includes a threaded bolt 58 having the eyelet 54 and a tightening lever 60 threadably mounted to the bolt 58. As best shown in FIG. 3, once the clamp halves 32 and 34 are closed together, the lever nut 48 may be pivoted into the slot 56 and the lever 60 tightened to inhibit the lever nut 48 from pivoting out of the slot 56. In this manner, the clamp halves 32 and 34 are kept closed about the stuffing box 20. However, to ensure that the lever nut 48 does not release the clamp halves, the auxiliary release pin 50 is inserted through aligned bores 62 disposed outward of the lever nut 48 in the closed position to secure the lever nut 48 within the slot 56. The safety pin 50 is provided with a spring-biased camming bearing 64 to retard removal of the release pin 50. Thus, once the clamp assembly 30 is mounted to the stuffing box 20, a dual locking system ensures that the tool will not be inadvertently released under the extreme pressures acting thereon.

The threaded rod 36 which forms the hinge axis of the clamp assembly 30 extends longitudinally from the clamp 30 in the direction of insertion and retraction of the probe 18. Threadably mounted to the rod 36 and normally positioned proximate the clamp assembly 30 is an auxiliary retraction nut 66 which is utilized to retract the probe 18 under special circumstances as will be subsequently described. Mounted to the threaded rod 36 axially above the clamp 30 and auxiliary nut 66 is a thrust coupling 68. The thrust coupling 68 comprises a cylindrical sleeve 70 which forms the body of the coupling 68 and a pair of flange bushings 72 received within the sleeve 70. The flanged bushings 72 facilitate linear or axial translational movement of the thrust coupling 68 along the threaded rod 36 without requiring a guide frame or track to prevent rotation of the coupling 68 about the threaded rod 36. In addition, the thrust coupling 68 includes a mounting flange 74 fixedly attached to the side of the sleeve 70. The mounting flange 74 has an aperture 76 adapted to receive and retain the probe 18 in fixed relation to the thrust coupling 68 as will be hereinafter described. Disposed axially above the thrust coupling 68 and mounted to the rod 36 is means for manually driving the thrust coupling 68 in the form of a handle nut 76. The handle nut 76 includes a hex nut 78 threadably mounted to the rod 36 and handles 80 for manually rotating the nut such that the handle nut 76 and the thrust coupling 68 travel up and down the threaded rod 36. Although the handle nut 76 and the thrust coupling 68 are not joined, the pressure induced through the probe 18 normally causes the thrust coupling 68 to remain in proximate contact with the handle nut 76.

The upper end 24 of the probe 18 is directly attached to the mounting flange 74 of the thrust coupling 68. After removing the protective cap 26, the end 24 of the probe 18 is placed through the aperture 76 until the load fitting 82, which is threadably attached to the upper end 24 of the probe 18, abuts the bottom of the flange 74. By replacing the cap 26, the flange 74 is positionally captured to secure the probe 18 to the thrust coupling 68.

Referring now to FIGS. 2 through 4, although the tool 10 can now be utilized to insert and retract the probe 18, the present invention can also be used with an auxiliary clamp assembly 90 adapted to further prevent blowout of the probe 18. The auxiliary clamp 90 includes a lower flange plate 92 attached to the stuffing box or gland body 20 and an upper flange plate 94 attached to the upper end 24 of the probe. The lower plate 92 is retained by the packing gland nut 96 which is matingly received by the gland body 20. The gland nut 96 includes a lock nut 98 which retards the telescoping movement of the probe 18 through the gland body 20. The upper plate 94 is maintained on the upper end 24 of the probe 18 by the fitting 82. Extending between the plates 92 and 94 is a cable 100 of predetermined length which limits the retraction distance of the probe 18. In addition, a pair of threaded rods 102 may be selectively utilized to maintain the probe 18 at a desired depth within the pipeline 12. Each of the rods 102 are provided with outer limiting nuts 104 and inner limiting nuts 106 which are utilized to prevent travel, in either direction, of the flange plates 92 and 94 and, as a result, the sensing probe 18.

Operation of the present invention provides controlled insertion and retraction of the probe 18 into and from the high pressure pipeline 12 in order to measure, control or sense conditions within the pipeline 12 without fluid leakage past the probe 18 while simultaneously facilitating proper, efficient operation. With the access valve 14 closed, the probe 18, along with the flange plates 92 and 94 secured thereto, is connected to the stuffing box 20 using the locking nut 98 and the stuffing nut 96 which telescopically retain the probe 18. Thereafter, the stuffing box assembly 20 along with the probe 18 are mounted to the NPT nipple 15 which extends from the access valve 14. The stuffing nut 96 should now be hand tightened to ensure engagement with the stuffing box assembly 20. The probe 18 is now mounted to the access valve and stuffing box assembly and the retractor tool 10 can be attached thereto.

With the clamshell clamp assembly 30 open, the clamp halves 32 and 34 are placed around the stuffing box 20 and secured with the lever nut 48 which is pivoted into the slot 56. The auxiliary pin 50 is positioned through the bore 62 to prevent release of the lever nut 48. The lever nut 48 is tightened to securely close the clamp assembly 30 about the stuffing box 20. The protective cover 26 of the probe 18 is removed to allow the flange 74 of the thrust coupling 68 to be placed over the upper end 24 of the probe 18. A coupling fitting (not shown) may be secured to the upper end 24 of the probe 18 in place of the cap 26 to facilitate connection of the probe to the measuring instruments I. The handle nut 76 is then rotated downwardly until it rests just above the thrust coupling 68. The access valve 14 can now be opened to pressurize the stuffing box 20. The lock nut 98 and the gland/stuffing nut 96 should be loosened to permit free movement of the probe 18 therethrough without permitting fluid leakage.

The probe 18 is inserted into the pressurized fluid vessel 12 by rotating the handle nut 76 in a clockwise direction until the desired insertion depth for the probe 18 is obtained. The lock nut 98 and gland nut 96 are again tightened to inhibited travel of the probe 18 through the stuffing box 20. If the auxiliary clamp assembly 90 is required or desired, the inner limiting nuts 106 are mounted to the rods 102 and the ends of the threaded rods 102 are placed through the corresponding apertures of the flange plates 92 and 94. The outer limiting nuts 104 are attached to the rods 102 and tightened against the flange plates 92 and 94. To ensure secure clamping, the inner nuts 106 are tightened flush against the plates 92 and 94 as shown in FIG. 2. The retractor tool 10 can now be removed from the probe 18 by removing the handle nut 76 and thrust coupling 68 from the threaded rod 36 and thereafter opening the clamp assembly 30. The auxiliary clamp assembly 90 will prevent the probe 18 from blowing out of the stuffing box 20.

To retract the probe 18 using the tool 10 of the present invention mounted thereto, the auxiliary clamp 90, if present, must be partially disassembled by removing the top pair of outer limiting nuts 104 to free the upper flange plate 94. After loosening the lock nut 98 and the stuffing nut 96 to permit telescopic movement of the probe 18, the handle nut 76 is rotated counter-clockwise which allows the system pressure to drive the thrust coupling 68 up the rod 36 and the probe 18 out of the pipeline 12 until the access valve 14 can be closed. In the event system pressure is not sufficient to drive the probe 18 and thrust coupling 68 up the threaded rod 36 because of scale or debris on the probe 18, the auxiliary retraction nut 66 may be utilized to move the thrust coupling 68 up the rod 36. By rotating the auxiliary retraction nut 66 against the bottom of the thrust coupling 68 while keeping the handle nut 76 just above the thrust coupling 68, the probe 18 can be safely retracted. Once the probe 18 has been fully retracted (usually when the cable 100 is taut) the access valve 14 may be closed and the retractor tool 10 and probe 18 may be removed from the system.

Thus, the present invention provides a simple, convenient and efficient method of inserting and retracting a sensing probe into and from the high pressure environment of a fluid pipeline. The tool incorporates numerous features to prevent blowout of the probe yet is lighter, smaller and less complex than past known tools to provide convenient use. The connective assembly of the clamshell clamp assembly and the hollow threaded rod eliminates the need for a supportive frame or a gearbox assembly thereby allowing simple mounting to the stuffing box, connected to an access valve on the pipeline.

The foregoing detailed description has been given for clearness of understanding only and no unnecessary limitations should be understood therefrom as some modifications will be obvious to those skilled in the art without departing from the scope and spirit of the appended claims.

I claim:

1. A tool adapted to insert and retract a sensing probe into and from a pressurized fluid vessel through an access valve and stuffing box assembly connected to the pressurized vessel, said tool comprising:

clamp means detachably mountable to the access valve and stuffing box assembly of the pressurized vessel;

a threaded rod attached to said clamp means and extending longitudinally in the direction of insertion and retraction of the sensing probe, said threaded rod forming a pivot axis of said clamp means;

a thrust coupling coaxially mounted to said threaded rod, said thrust coupling including a mounting flange adapted to detachably receive the sensing probe for translational movement therewith; and manual drive means threadably mounted to said threaded rod for moving said thrust coupling up and down said threaded rod wherein said sensing probe travels into and from the pressurized vessel through the access valve as said thrust coupling is moved up and down said threaded rod by said manual drive means.

2. The tool as defined in claim 2 and further comprising an adapter coupling secured to the probe, said adapter coupling cooperating with said mounting flange of said thrust coupling to detachably secure the sensing probe to said thrust coupling and retractor tool.

3. The tool as defined in claim 2 wherein said clamp means comprises a clamshell clamp assembly adapted to clampingly engage the stuffing box assembly, said clamshell clamp assembly including a pair of pivotally connected clamp halves.

4. The tool as defined in claim 3 wherein said clamp halves are pivotally joined at a hinge, said threaded rod forming the pivot axis of said hinge such that said clamp halves are pivotally joined to said threaded rod.

5. The tool as defined in claim 4 wherein said threaded rod is hollow having an axial bore extending therethrough.

6. The tool as defined in claim 4 wherein said clamp assembly includes locking means for lockingly closing said clamp assembly about the stuffing box assembly, said locking means comprising a lever nut pivotally mounted to said clamp assembly and extending laterally through said clamp halves to secure said clamp halves to each other and an auxiliary release pin extending longitudinally through one of said clamp halves, said release pin adapted to prevent pivotal movement of said lever nut.

7. The tool as defined in claim 3 and further comprising an auxiliary retraction nut mounted to said threaded rod intermediate said clamp assembly and said thrust coupling, said retraction nut providing auxiliary means for moving said thrust coupling up said threaded rod to retract the sensing probe.

8. The tool as defined in claim 7 wherein said manual drive means comprises a handle nut axially mounted to said threaded rod above and proximate said thrust coupling wherein rotation of said handle nut in a first direction linearly moves said thrust coupling down said threaded rod to insert the sensing probe into the pressurized vessel, and rotation of said handle nut in a second direction permits said thrust coupling to move up said threaded rod to retract the sensing probe from the pressurized vessel.

9. A tool adapted to insert and retract a sensing probe into and from a pressurized fluid vessel through an access valve and stuffing box assembly connected to the pressurized vessel, said tool comprising:
  a clamp assembly for detachably mounting said tool to the access valve and stuffing box assembly of the pressurized vessel;
  a threaded rod attached to said clamp assembly and extending longitudinally in the direction of insertion and retraction of the sensing probe, said threaded rod forming a pivot axis of said clamp assembly;
  a thrust coupling coaxially mounted to said threaded rod, said thrust coupling including a mounting flange having an aperture;
  an adapter coupling secured to the sensing probe, said adapter coupling cooperating with said aperture of said mounting flange to detachably secure the sensing probe to said thrust coupling wherein translational movement of said thrust coupling is imparted to the sensing probe;
  manual drive means threadably mounted to said threaded rod for moving said thrust coupling up and down said threaded rod wherein said sensing probe travels into and from the pressurized vessel through the access valve as said thrust coupling is moved down and up said threaded rod by said manual drive means; and
  means for selectively securing said sensing probe to the stuffing box, said tool detachable from the sensing probe and pressurized vessel to independently maintain the sensing probe within the vessel.

10. The tool as defined in claim 9 wherein said clamp assembly comprises a pair of clamp halves pivotally connected to said threaded rod, said threaded rod forming the hinge axis of said clamp assembly.

11. The tool as defined in claim 10 wherein said clamp assembly includes locking means for lockingly securing said clamp halves about the stuffing box assembly, said locking means comprising a lever nut pivotally mounted to said clamp assembly and adapted to selectively extend laterally through said clamp halves to secure said clamp halves to each other and a safety release pin extending longitudinally through one of said clamp halves, said release pin adapted to selectively prevent pivotal movement of said lever nut.

12. The tool as defined in claim 10 and further comprising an auxiliary retraction nut mounted to said threaded rod intermediate said clamp assembly and said thrust coupling, said retraction nut providing auxiliary means for moving said thrust coupling up said threaded rod to retract the sensing probe from the pressurized vessel.

13. The tool as defined in claim 12 wherein said manual drive means comprises a handle nut axially mounted to said threaded rod above and proximate said thrust coupling wherein rotation of said handle nut in a first direction linearly moves said thrust coupling down said threaded rod to insert the sensing probe into the pressurized vessel and rotation of said handle nut in a second direction permits said thrust coupling to move up said threaded rod to retract the sensing probe from the pressurized vessel.

14. A tool adapted to insert and retract a sensing probe into and from a pressurized fluid vessel through an access valve an a stuffing box assembly connected to the pressurized vessel, said tool comprising:
  a clamshell clamp assembly for detachably mounting said tool to the stuffing box assembly of the pressurized vessel, said clamshell clamp assembly including a pair of pivotally connected clamp halves;
  a threaded rod attached to said clamp assembly and extending longitudinally in the direction of insertion and retraction of the sensing probe, said threaded rod forming a hinge axis of said clamp assembly;
  a thrust coupling coaxially mounted to said threaded rod, said thrust coupling including a mounting flange having an aperture;
  an adapter coupling secured to the sensing probe, said adapter coupling cooperating with said aperture of said mounting flange to attach the sensing probe to said thrust coupling wherein translational movement of said thrust coupling is imparted to said adapter coupling and sensing probe; and
  manual drive means threadably mounted to said threaded rod proximate said thrust coupling for moving said thrust coupling up and down said threaded rod wherein said sensing probe travels into and from the pressurized vessel through the access valve as said thrust coupling is moved down and up said threaded rod by said manual drive means.

15. The tool as defined in claim 14 and further comprising an auxiliary retraction nut mounted to said threaded rod intermediate said clamp assembly and said thrust coupling.

16. The tool as defined in claim 15 wherein said clamp assembly includes locking means for lockingly securing said clamp assembly about the stuffing box assembly.

17. The tool as defined in claim 15 wherein said threaded rod is hollow having an axial bore extending therethrough.

18. A tool adapted to insert and retract a sensing probe into and from a pressurized fluid vessel through an access valve and stuffing box assembly connected to the pressurized vessel, said tool comprising;

a clamp assembly for detachably mounting said tool to the access valve and stuffing box assembly of the pressurized vessel, said clamp assembly including a pair of clamp halves;

a threaded rod attached to said clamp assembly and extending longitudinally in the direction of insertion and retraction of the sensing probe, said pair of clamp halves of said clamp assembly pivotally connected to said threaded rod such that said threaded rod forms the hinge axis of said clamp assembly;

a thrust coupling coaxially mounted to said threaded rod, said thrust coupling including a mounting flange having an aperture;

an adapter coupling secured to the sensing probe, said adapter coupling cooperating with said aperture of said mounting flange to attach the sensing probe to said thrust coupling wherein translational movement of said thrust coupling is imparted to the sensing probe; and manual drive means threadably mounted to said threaded rod for moving said thrust coupling up and down said threaded rod wherein said sensing probe travels into and from the pressurized vessel through the access valve as said thrust coupling is moved down and up said threaded rod by said manual drive means.

19. A tool adapted to insert and retract a sensing probe into and from a pressurized fluid vessel through an access valve and stuffing box assembly connected to the pressurized vessel, said tool comprising;

a clamshell clamp assembly adapted to detachably clampingly engage the stuffing box assembly of the pressurized vessel, said clamshell clamp assembly including a pair of pivotally connected clamp halves joined at a hinge;

a threaded rod attached to said clamp assembly and extending longitudinally in the direction of insertion and retraction of the sensing probe, said threaded rod forming the pivot axis of said hinge such that said clamp halves are pivotally joined to said threaded rod;

a thrust coupling coaxially mounted to said threaded rod, said thrust coupling including a mounting flange adapted to receive the sensing probe for translational movement therewith; and manual drive means threadably mounted to said threaded rod for moving said thrust coupling up and down said threaded rod therein said sensing probe travels into and from the pressurized vessel through the access valve as said thrust coupling is moved up and down said threaded rod by said manual drive means.

20. The tool as defined in claim 19 and further comprising an adapter coupling secured to the sensing probe, said adapter coupling cooperating with said mounting flange of said thrust coupling to attach the sensing probe to said thrust coupling.

21. A tool adapted to insert and retract a sensing probe into and from a pressurized fluid vessel through an access valve and stuffing box assembly connected to the pressurized vessel, said tool comprising;

a clamp assembly for detachably mounting said tool to the access valve and stuffing box assembly, said clamp assembly including a pair of pivotally connected clamp halves and locking means for detachably locking said clamp halves about the stuffing box assembly;

a threaded rod attached to said clamp assembly and extending longitudinally in the direction of insertion and retraction of the sensing probe;

a thrust coupling coaxially mounted to said threaded rod, said thrust coupling including a mounting flange having an aperture;

an adapter coupling secured to the sensing probe, said adapter coupling cooperating with said aperture of said mounting flange to detachably secure the sensing probe to said thrust coupling wherein translational movement of said thrust coupling is imparted to the sensing probe; and manual drive means threadably mounted to said threaded rod for moving said thrust coupling up and down said threaded rod wherein said sensing probe travels into and from the pressurized vessel through the access valve as said thrust coupling is moved down and up said threaded rod by said manual drive means.

* * * * *